(12) United States Patent
Quitoriano et al.

(10) Patent No.: US 9,008,467 B2
(45) Date of Patent: Apr. 14, 2015

(54) NANOPARTICLE-BASED QUANTUM CONFINED STARK EFFECT MODULATOR

(75) Inventors: Nathaniel Quitoriano, Pacifica, CA (US); Marco Fiorentino, Mountain View, CA (US); David Fattal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1622 days.

(21) Appl. No.: 12/262,312

(22) Filed: Oct. 31, 2008

(65) Prior Publication Data

US 2009/0238511 A1 Sep. 24, 2009

Related U.S. Application Data

(60) Provisional application No. 61/038,343, filed on Mar. 20, 2008.

(51) Int. Cl.
*G02F 1/035* (2006.01)
*G02F 1/025* (2006.01)
*G02F 1/015* (2006.01)

(52) U.S. Cl.
CPC ............ *G02F 1/025* (2013.01); *G02F 2202/36* (2013.01); *G02F 2001/0157* (2013.01); *G02F 2201/063* (2013.01)

(58) Field of Classification Search
None
See application file for complete search history.

(56) References Cited

U.S. PATENT DOCUMENTS

| 4,525,687 | A | 6/1985 | Chemla et al. |
| 7,180,648 | B2 * | 2/2007 | Dohrman et al. ............. 359/248 |
| 2005/0059213 | A1 * | 3/2005 | Steimle et al. ................ 438/260 |
| 2006/0046447 | A1 | 3/2006 | Yamamoto |
| 2006/0078254 | A1 * | 4/2006 | Djordjev et al. ................ 385/32 |
| 2008/0017863 | A1 * | 1/2008 | Chen .............................. 257/69 |
| 2009/0015906 | A1 * | 1/2009 | Kimerling et al. ......... 359/341.5 |

* cited by examiner

*Primary Examiner* — Michelle R Connelly
*Assistant Examiner* — John M Bedtelyon
(74) *Attorney, Agent, or Firm* — Van Cott, Bagley, Cornall & McCarthy

(57) ABSTRACT

An optical modulator includes a first layer that is transparent or semitransparent over a range of optical wavelengths; a modulation layer made from nanoparticles embedded in a matrix; a first electrode and a second electrode that create an electrical field that passes through the modulation layer. A method for forming a nanoparticle modulator includes obtaining and preparing a substrate; forming sub-layers on the substrate; forming a nanoparticle modulator layer, where the nanoparticle modulator layer is an electrical insulator and has a thickness of less than the wavelength of light the nanoparticle QCSE modulator is designed to modulate.

19 Claims, 8 Drawing Sheets

Fig. 4A  Fig. 4B

NANOPARTICLE-BASED QUANTUM CONFINED STARK EFFECT MODULATOR

CROSS-REFERENCE TO RELATED APPLICATION

The present application claims priority from provisional application Ser. No. 61/038,343, filed Mar. 20, 2008, the contents of which are incorporated herein by reference in their entirety.

BACKGROUND

Light beams or optical signals are frequently used to transmit digital data between electronic devices such as between components on a single circuit board, between adjacent circuit boards, and even over long distances. An optical signal may also be used for other purposes including position or motion sensing, measurement, reading encoded data, etc.

Consequently, optical technology plays a significant role in modern electronics, and many electronic devices employ optical components. Examples of such optical components include, but are not limited to, optical or light sources such as light emitting diodes and lasers, waveguides, fiber optics, lenses and other optics, photo-detectors and other optical sensors, optically-sensitive semiconductors, and others.

Such systems making use of optical components often rely upon the precise manipulation of the optical energy or beam of light to accomplish a desired task. This is especially true in systems utilizing light for high-speed, low-energy communication of data. Such manipulation of an optical signal may include selectively encoding information in a light beam and then directing the light beam to a sensor that detects the optical energy and converts the encoded information into an electrical data signal.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIGS. 4A-4C are diagrams of light coupling between a waveguide and a ring resonator with an integral nanoparticle-based modulator layer, according to one embodiment of the principles described herein.

Throughout the drawings, identical reference numbers designate similar, but not necessarily identical, elements.

DETAILED DESCRIPTION

Figure 1:
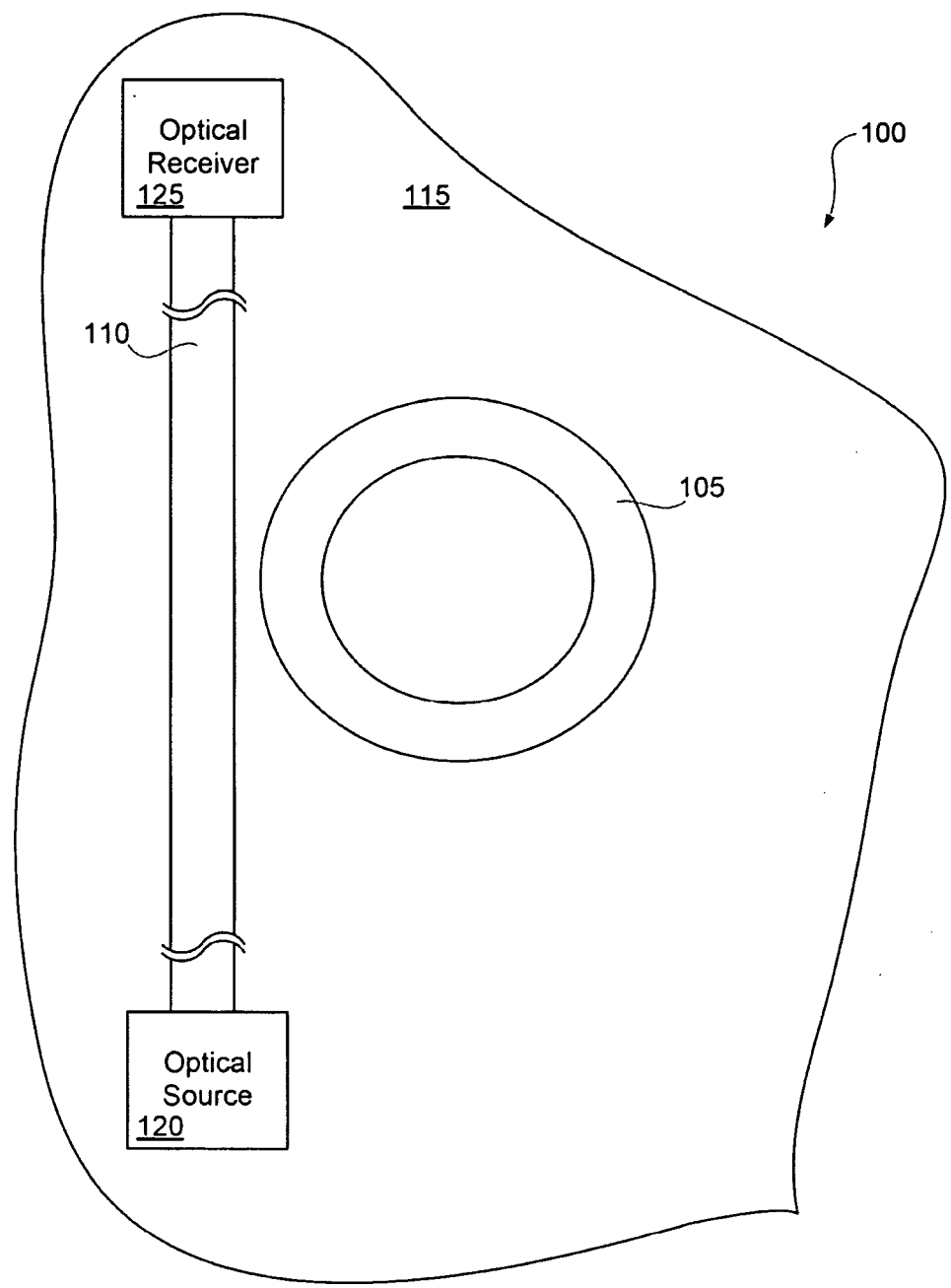
FIG. 1 is a top view of an illustrative ring resonator and tangential waveguide, according to one embodiment of the principles described herein.

As noted above, light or optical beams can be used for a variety of purposes, including the transmission of data. In an optical interconnect system, the electrical signal from an integrated circuit (IC) chip or circuit component is converted into an optical signal emitted by a light source, the optical signal being modulated to represent data. The light then travels through free space or through a waveguide to a detector which converts the received optical signal back into an electrical data signal. Optical fibers are one example of a waveguide. These optical interconnections are not constrained by capacitance or resistance issues of traditional wired electrical connections. Furthermore, optical transmission methods can potentially transmit a greater volume of data than a conductive wire.

The present specification discloses systems and methods related to the use of a nanoparticle-based modulator layer integral to waveguides that can be used to encode information into transmitted optical energy.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. The term "optical source" refers to a device from which optical energy originates. Examples of optical sources as thus defined include, but are not limited to, light emitting diodes, lasers, light bulbs, and lamps.

As used in the present specification and in the appended claims, the terms "optical cavity" or "optical resonator" refer to a structure that sustains optical energy having a certain resonant wavelength or range of wavelengths and that suppresses or attenuates other optical energy by destructive interference. The term "band gap" refers to the difference between a conduction band energy level and the valence band energy level for a given material. The term "quantum dot" or "nanoparticle" refers to a semiconductor nanostructure that confines the motion of charge carriers in all three spatial directions. The confinement can be due to electrical fields, the presence of an interface between different semiconductor materials, the presence of a free semiconductor surface, or a combination of the previously listed elements.

As used in the present specification and in the appended claims, the term "dielectric" broadly refers to a material that provides electrical insulation. In the present embodiment, silicon dioxide is used as a dielectric. In alternative embodiments, the dielectric layer may be composed of different material.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

FIG. 1 is a top view of an illustrative optical system (100) comprising a ring resonator (105) and tangential waveguide (110). The tangential waveguide (110) is arranged tangentially to the ring resonator (105). The ring resonator (105) and tangential waveguide (110) are in optical communication with each other near the point of tangency.

The ring resonator (105) and tangential waveguide (110) may be fabricated out of semiconductor materials, such as silicon, gallium arsenide, germanium, or other suitable materials that are at least semitransparent in the desired wavelength region. Other materials, such as metals, may also be included in the optical modulator as electrical conductors or for other uses. According to one illustrative embodiment, the ring resonator (105) and tangential waveguide (110) are fabricated on a substrate (115), such as silicon. In some embodiments, an insulating layer such as silicon dioxide may be fabricated on the substrate (115).

The ring resonator (105) has a resonant frequency that depends on both the physical characteristics of the ring (105) and ambient conditions. Consequently, the ring resonator (105) is configured to sustain optical energy having a wavelength matching the ring's resonant frequency or a range of wavelengths above and below the resonant frequency.

Optical energy is generated by an optical source (120), such as a laser or a light emitting diode (LED) and enters a first end of the tangential waveguide (110). The ring resonator (105) preferentially couples frequencies of optical energy passing through the tangential waveguide (110) that match the resonant frequencies of the ring resonator (105). The optical energy coupled from the tangential waveguide (110) enters the ring resonator (105) and circulates around the ring resonator (105) until it is dissipated.

The effective optical index and the energy dissipation rate in the ring resonator (105) can be modified to alter both the rate at which optical energy is exchanged between the tangent waveguide (110) and the ring resonator (105), and the amount of light that is ultimately dissipated inside the ring resonator (105). This allows the optical energy passing through the tangential waveguide (110) to be modulated to carry desired data. The term "modulation" refers to encoding information in the light transmitted through the waveguide by converting electrical signals into optical variations in the transmitted light.

According to one exemplary embodiment, the rate at which the ring resonator (105) accepts optical energy from the tangential waveguide (110) is configured to be equal to the optical energy dissipation rate in the ring resonator (105). This condition is known as "critical coupling." When critical coupling is achieved, the tangential waveguide (110) transfers all incident energy of a given wavelength into the ring resonator (105), where it is dissipated either by absorption or scattering. More precisely, a tangential waveguide and ring resonator are critically coupled when the following equation is satisfied: $1/Q_{coup}=1/Q_{abs}+1/Q_{scat}$, where $Q_{coup}$ represents the energy transfer rate from the waveguide to the ring resonator, $Q_{abs}$ represents the energy dissipation due to absorption within the ring resonator, and $Q_{scat}$ represents the energy that escapes the ring resonator due to scattering.

As shown by the equation above, when the ring resonator (105) is critically coupled to the tangential waveguide (110), the degree of coupling, or the energy transfer rate, of optical energy from the tangential waveguide (110) and the ring resonator (105) is directly related to the optical energy dissipation within the ring resonator (105). The optical energy dissipation rate ($Q_{coup}$) within the ring resonator (105) may be controlled by two factors: the absorption of light within the ring resonator, which is represented by the term $Q_{abs}$ in the equation above, and the portion light that escapes the ring resonator due to scattering, which is represented by the term $Q_{scat}$. If the ring resonator (105) dissipates optical energy at a rate equal to the amount of optical energy incident in the waveguide (110) at the optical cavity's resonant frequency, then all the optical energy of that frequency in the waveguide will be transferred to and dissipated in the resonator.

The absorption of a nanoparticle modulator layer contained within the ring resonator (105) can be altered at high frequencies by applying a voltage across the nanoparticle modulator layer. By varying the absorption of the nanoparticle modulator layer, the coupling of optical energy from the tangential waveguide (110) into ring resonator (105) can be changed, thereby allowing data to be encoded into a particular wavelength or wavelengths of optical energy passing through the tangential waveguide (110).

Figure 2:
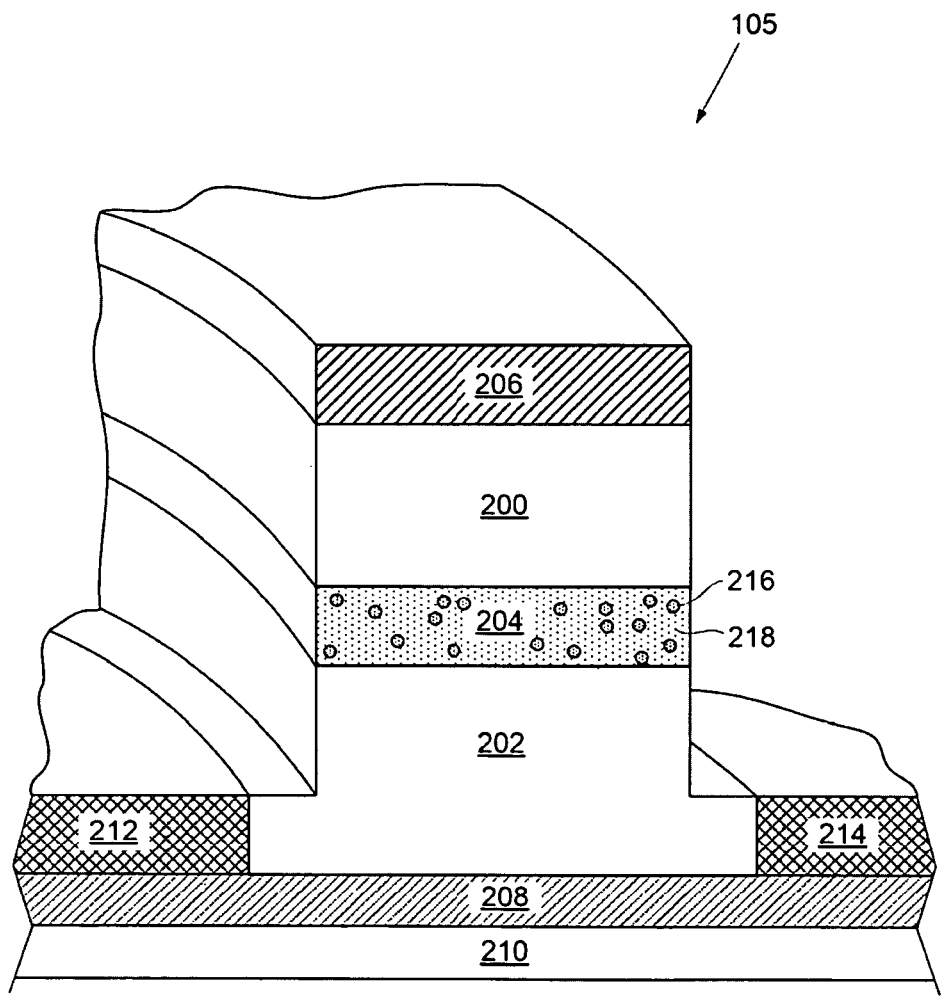
FIG. 2 is a cross-sectional diagram of an illustrative ring resonator with a nanoparticle-based modulator layer, according to one embodiment of the principles described herein.

FIG. 2 is a cross-sectional view of an illustrative ring resonator (105) with a nanoparticle-based modulator layer (204). According to one exemplary embodiment, the ring resonator (105) is made of a variety of layers and materials that can be deposited and shaped using photolithographic or other processes. According to one exemplary embodiment, the manufacturing process begins with a silicon-on-oxide (SOI) wafer. The SOI wafer has a substrate layer (210), a silicon dioxide passivation layer (208), and an overcoat of silicon which becomes the lower silicon layer (202). The lower silicon layer (202) is formed by etching the silicon overcoat of the wafer. Areas of the silicon overcoat can be doped to create the left and right electrodes (212, 214).

A nanoparticle modulator layer (204) then created on top of the silicon layer (202) and an upper silicon layer (200) is deposited above the nanoparticle modulator layer (204). A top electrode (206) is formed above the upper silicon layer (200). According to one exemplary embodiment, the electrodes (206, 212, 214) are formed by doping silicon with appropriate materials to create a high density of free charge carriers within the doped silicon region.

It is understood that the specification is not limited to the specific geometry or materials of a particular embodiment. By way of example and not limitation, the nanoparticle modulator layer (204) could be oriented vertically rather than horizontally. Additionally, the number, type, and locations of electrodes could be altered.

The upper and lower silicon layers (200, 202) are transparent or semitransparent to particular wavelengths of light that are to be modulated by the ring resonator (105). The resonant frequency of the ring resonator (105) is influenced by the optical and geometric properties of the layers that make up the ring resonator. For example, the resonant frequency is influenced by the index of refraction and diameter of the upper and lower silicon layers (200, 202).

As mentioned above, in one exemplary embodiment the nanoparticle modulator layer (204) is sandwiched between the upper and lower silicon layers (200, 202). The nanoparticle modulator layer (204) is comprised of a matrix (218) in which nanoparticles (216) are embedded. According to one exemplary embodiment, the nanopartide modulator layer (204) has a lower index of refraction than the upper and lower silicon layers (200, 202) and a thickness of less than one wavelength of the light that the ring resonator (105) is designed to modulate. In this configuration, the nanoparticle modulator layer (204) serves as a slot waveguide which additionally confines the optical energy to the region adjacent to the modulator layer (204).

Although there are many mechanisms that can lead to absorption and scattering of the light within the ring resonator, the ring resonator becomes more efficient in modulating optical energy when the modulator layer (204) is the primary means of absorption within the ring resonator (105), and losses due to scattering are minimized. By configuring the modulator layer (204) to serve as a slot wave guide, the optical energy is drawn into and around the modulator layer (204). This optical confinement produced by the slot wave guide configuration increases the interaction between the optical energy and the modulator layer (204). Additionally, the optical energy is drawn away from the exterior edges of the waveguide where undesirable scattering losses could occur. The optical energy is also drawn away from the electrodes (206, 212, 214), metallic contacts, and other absorptive layers that surround the modulator (204) and silicon layers (200, 202).

According to one exemplary embodiment, the nanoparticles (216) are embedded within the matrix (218). The nanoparticles (216) and matrix (218) may be formed in a variety of ways and from various materials. According to one exemplary embodiment, a layer or layers of silicon-germanium (SiGe) can be deposited and then thermally oxidized. The thermal oxidization process forms Ge nanoparticles as the oxygen preferentially binds with Si and the oxide growth front expels Ge. In this manner, Ge nanoparticles can be embedded in a matrix of silicon oxide ($SiO_2$) insulator. A variety of factors can influence the number, distribution, composition and size of the Ge nanoparticles. These factors include, but are not limited to, the ratio of silicon to germanium in the original silicon germanium layer, the temperature at which the thermal oxidization was performed, the oxidizing atmosphere during the thermal oxidization process and other factors.

By way of example and not limitation, Ge nanoparticles embedded in an oxide matrix can be obtained by steam thermal oxidization at 650° C. of polycrystalline SiGe layers (wet oxidization) or by the deposition of discontinuous Ge films/ $SiO_2$ multilayers by low pressure chemical vapor deposition at 390° C. and thermal annealing at 700° C. (dry oxidization).

The nanoparticle modulator layer (204) is not limited to the materials discussed above, but may be formed from any suitable combination of materials. By way of example and not limitation, the nanoparticles may be formed using 111N semiconductors such as gallium arsenide (GaAs), Indium phosphide (InP), indium gallium arsenide (InGaAs), indium gallium arsenide phosphide (InGaAsP), and other alloys; and II/VI semiconductors such as zinc selenide (ZnSe), zinc cadmium selenide (ZnCdSe), and other alloys.

As discussed above, nanoparticles (216) are nanostructures that confine the motion of charge carriers in all three spatial directions. The confinement of charge carriers in the nanoparticles is altered in the presence of an exterior electrical field. To modulate the light contained within a waveguide, an electrical signal that represents the information to be encoded into the light is generated and conveyed to the ring resonator (105) as a voltage difference across the top electrode (206) and one or more of the bottom electrodes (212, 214). This voltage difference creates an electric field that permeates the nanoparticle modulator layer (204). As described below, the electric field alters the light absorption characteristics of the nanoparticle modulator layer (204), which changes total dissipation of optical energy within the ring resonator (105).

According to one exemplary embodiment, the "off" state of the modulator is realized by tuning the absorption of the nanoparticle modulator layer (204) to a value that insures critical coupling. In that state, all the incident light from the tangential waveguide (110, FIG. 1) of a specific wavelength or range of wavelengths is absorbed in the ring resonator (105, FIG. 1), and no optical energy is transmitted beyond the ring resonator (105, FIG. 1). The "on" state is realized by tuning the absorption of the nanoparticle modulator layer (204) well away from the critical coupling value. This can be done by increasing or decreasing the absorption of the nanoparticle modulator layer (204). Consequently, the designated wavelength or range of wavelengths of optical energy are not entirely coupled into and dissipated by the ring resonator (105) and thus pass to the photodetector or other optical receiver (125, FIG. 1). Thus, the ring resonator (105, FIG. 1) converts a voltage across the electrodes into a modulation of the amplitude or a designated wavelength or range of wavelengths of light within the waveguide (110, FIG. 1).

As indicated, the optical energy within the waveguide can be comprised of a single frequency or a combination of optical frequencies within which the waveguide is optically transparent. For example, a silicon waveguide is capable of transmitting light with wavelengths from about 400 nm to 2 microns. The waveguide can be optically coupled to a number of different ring resonators. Each ring resonator can be tuned to modulate a single frequency of optical energy passing through the waveguide.

Figure 3:
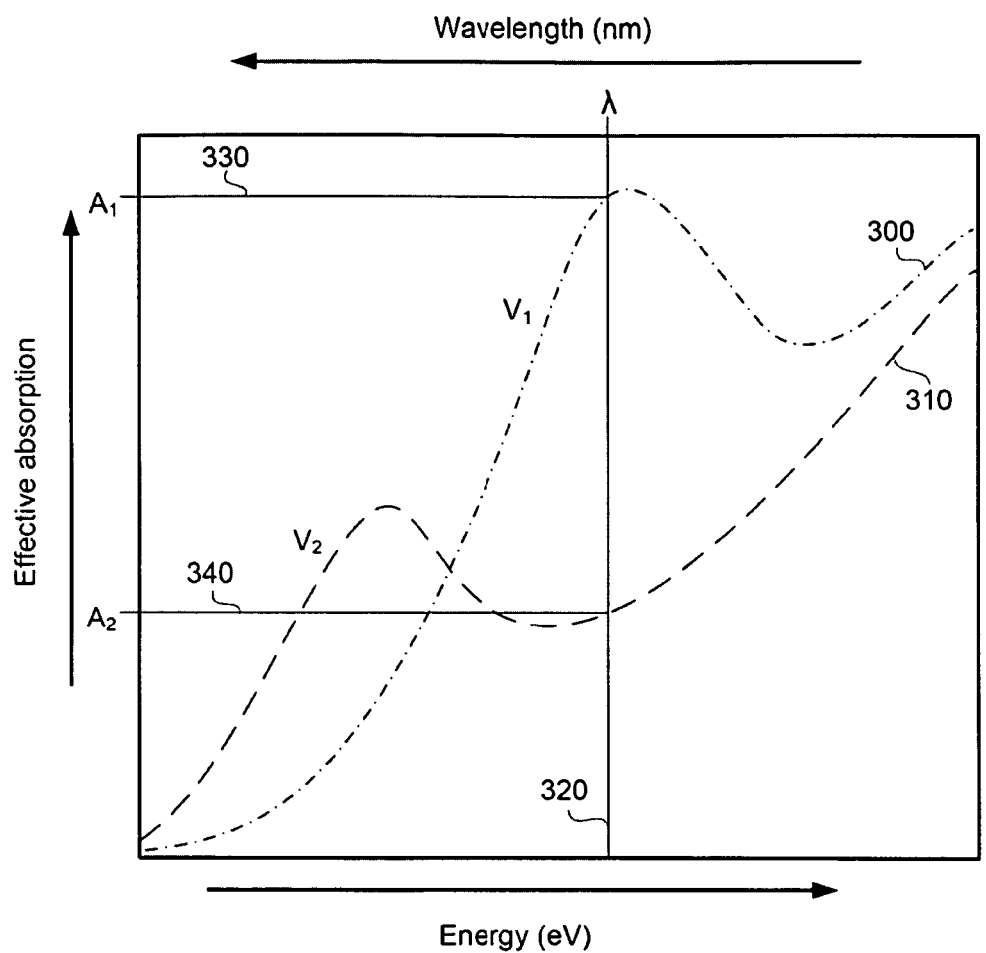
FIG. 3 is a diagram showing an idealized relationship between applied electrical voltage and the light absorption characteristics of the nanoparticle-based modulator layer, according to one embodiment of the principles described herein.

FIG. 3 shows a diagram that describes the effect of changing the voltage across the electrodes (206, 212, 214; FIG. 2) on the effective photon absorption of the nanoparticle modulator layer (204, FIG. 1). The diagram is an idealized representation and is only intended to conceptually illustrate the principles discussed herein.

The vertical axis of the diagram in FIG. 3 represents the range of effective photon absorption by a nanoparticle modulator layer. Lower absorption rates are represented as being closer to the abscissa with higher absorption rates being correspondingly more distant from the abscissa. The horizontal axis of FIG. 3 represents a range of photon energy levels as measured in electron volts, with lower energy levels being closest to the ordinate axis and higher energies being correspondingly more distant from the ordinate axis. The wavelength of light, as shown on the upper edge of the graph, is inversely proportional to the energy level of the photons. Thus, longer wavelengths of light have lower photon energies.

The graph contains two profiles, which represent the effective photon absorption of the nanoparticle modulator layer when it is permeated by two different electrical fields. The first profile (300) represents the effective absorption of the nanoparticle modulator layer when a voltage V1 is applied across the ring resonator electrodes (206, 212, 214; FIG. 2). Similarly, the second profile (310) represents the effective absorption of the nanoparticle modulator layer when a voltage V2 is applied across the electrodes. Light of wavelength λ is designated by a vertical line (320). A first horizontal line (330) corresponds to an effective absorption within the nanoparticle modulator layer of A1 for light of wavelength λ when voltage V1 is applied across the ring resonator electrodes. Similarly, a second horizontal line (340) corresponds to an effective absorption of A2 for light of wavelength λ when voltage V2 is applied across the ring resonator electrodes.

As shown in the graph, the effective absorption of the nanoparticle modulator layer is dependent both on applied voltage and the energy level of the incident light. By changing the applied voltage, the magnitude of the electrical field is changed in the nanoparticle modulator layer, thereby altering its light absorption characteristics. For example, at an applied voltage of V1, light of wavelength λ is strongly absorbed by the nanoparticle modulator layer. At an applied voltage of V2, the nanoparticle modulator layer absorbs much less light of wavelength λ.

The alteration of the light absorption in a nanoparticle modulator layer as a result of an applied electric field occurs because of the electric field's effect on the energy bands of the nanoparticles. In the absence of an electric field, the electrons are localized within the region of a nanoparticle and there is an overlap between electrons (or, more precisely, electron wave functions) and holes (or, more precisely, hole wave functions). If an electrical field is applied to the nanoparticle, however, valence band and conduction band "tilt" in response to the applied field. As the valence band and conduction band "tilt," a fraction of the electrons move outside of the nanoparticle. As the electrons (or electron wave functions) move outside of the nanoparticle, there are fewer re-combinations of holes with the electrons.

The ability of the nanoparticle modulator layer to absorb light at a certain wavelength λ directly depends on the number (or rather density) of unoccupied electron and hole states with an energy difference $$\frac{hc}{\lambda}.$$

In the case of a pure semiconductor with bandgap energy $$\frac{hc}{\lambda_{BG}},$$

this means there is no absorption at wavelength $\lambda > \lambda_{BG}$. In a semiconductor nanoparticle, electron and hole states can be confined spatially and acquire a "confinement energy" that depends on the electrostatic spatial profile. This confinement energy can be tuned by applying a DC electric field, a phenomenon known as the Quantum Confined Stark Effect (QCSE). In simple terms, when the electrostatic potential changes, electron and holes reorganize their spatial distribution to increase the "time" they spend in the lowest potential energy locations. This results in a change of the density of available electron-hole pairs transitions at a given wavelength λ, hence of the absorption at λ. Thus, by selectively varying the voltage across the ring resonator electrodes (206, 212, 214; FIG. 2) the light absorption characteristics of the nanoparticle modulator layer are altered and an optical signal can be modulated to carry a data signal. The absorption coefficient change is particularly large in the immediate vicinity of the band edge, where it jumps from zero to a finite value.

Figure 4C:
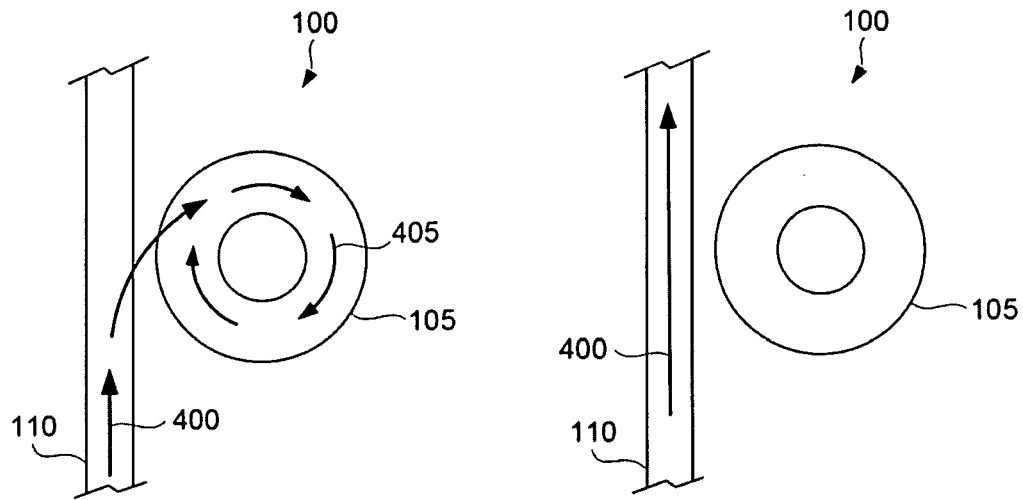
Figure 4C:
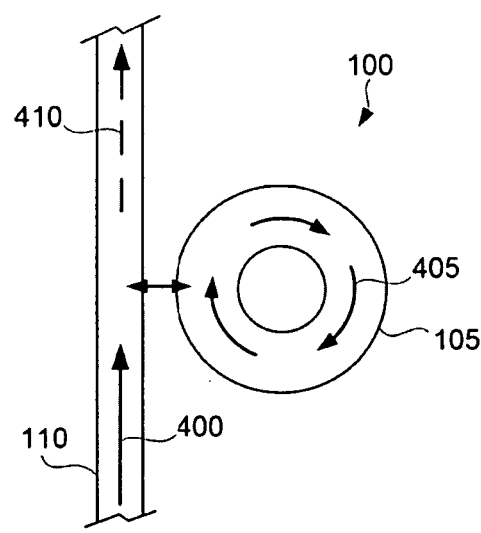

FIGS. 4A-4C illustrate the modulation by the ring resonator (105) of a specific wavelength (λ) of optical energy (400) transmitted through the tangential waveguide (110). FIG. 4A represents an idealized situation where a critically coupled ring resonator (105) accepts and dissipates all of the optical energy (400) of wavelength λ contained within the tangential waveguide (110). The absorption of substantially all of a specific wavelength of optical energy corresponds to an "off" state in modulation. As discussed above, this situation corresponds to strong absorption by the nanoparticle modulation layer (204, FIG. 2) of the light of wavelength λ and results in much of the incident light from the tangential waveguide (110, FIG. 1) being absorbed by the ring resonator. In the context of FIG. 3, where the monochromatic light flux (400) is of wavelength λ, the nanoparticle modulation layer (204, FIG. 2) would have a high effective absorption A1 when voltage V1 is applied across the ring resonator electrodes (206, 212, 214; FIG. 2).

FIG. 4B represents an idealized situation where a critically coupled ring resonator (105) does not interfere with the passage of light (400) through the tangential waveguide (110), or the "on" state in modulation. As discussed above, this situation corresponds to weak absorption by the nanoparticle modulation layer (204, FIG. 2) of the frequency of light contained in the waveguide. In the context of FIG. 3, where the light (400) is of wavelength λ, the nanoparticle modulation layer (204, FIG. 2) would have a low effective absorption when voltage V2 is applied across the ring resonator electrodes (206, 212, 214; FIG. 2). In practice, complete decoupling of the ring resonator (105) is difficult to achieve because of the parasitic dissipation of light energy within the ring resonator (105) as a result of absorption and scattering.

FIG. 4C illustrates the modulation of light flux (400) of wavelength λ by the ring resonator (105) in response to variations in the applied voltage across the ring resonator electrodes (208, 212, 214; FIG. 2). Similar to FIGS. 4A and 4B, the ring resonator is critically coupled to the waveguide (110). By varying the voltage across the ring resonator electrodes (208, 212, 214; FIG. 2), the effective absorptivity of the ring resonator (105) at wavelength λ changes according to the Quantum Confined Stark Effect. Because light is only coupled into the ring resonator (105) proportionately to the absorptivity of the ring resonator (105), changing the absorptivity by altering the voltage across the electrodes (208, 212, 214; FIG. 2) results in the modulation of light within the waveguide (110). The modulated light (410) carries the information in the form of a modulated light beam that passes through the wave guide to the receiving electronic component, where a photodetector will convert the modulated light beam back into an electrical data signal.

Figure 5:
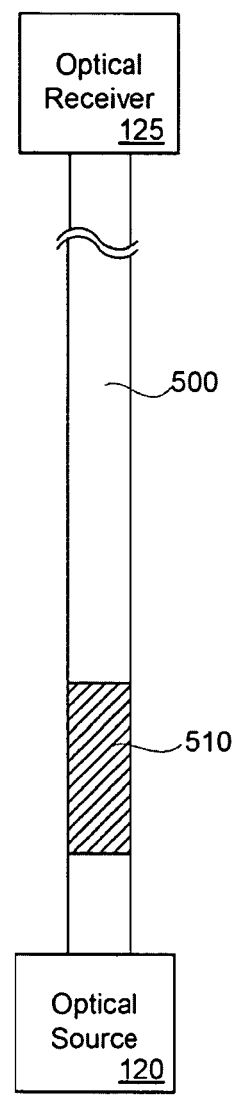
FIG. 5 is a top view of an illustrative waveguide with a nanoparticle-based modulator portion, according to one embodiment of the principles described herein.

FIG. 5 is a top view of an illustrative waveguide (500) having a nanoparticle-based modulator portion (510). According to this exemplary embodiment, the modulation occurs in a portion of a waveguide (500). Because the modulation of the optical signal occurs within the waveguide itself, additional components, such as a ring resonator are not used. Although the waveguide (500) of FIG. 5 is shown as being substantially linear it is understood that the geometry of the waveguide is not limited to a linear geometry. By way of example and not limitation, the shape of the waveguide could be altered to avoid conflicts with other components, to achieve a desired length, to reach a desired destination or for other reasons.

Figure 6:
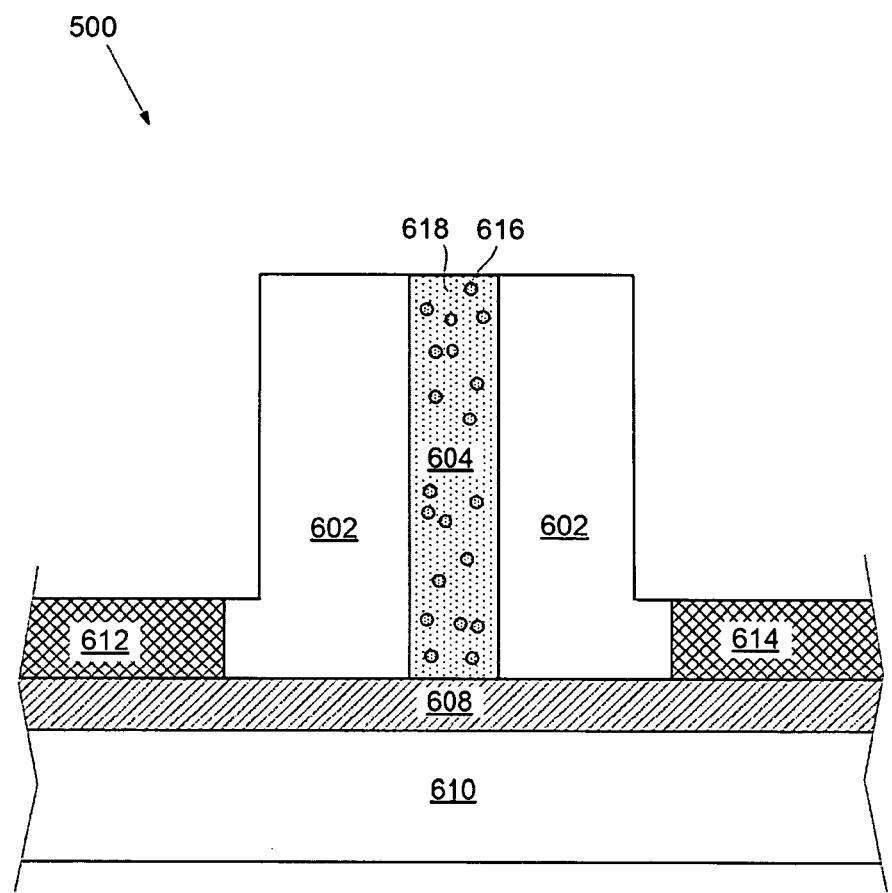
FIG. 6 is a cross-sectional diagram of an illustrative waveguide with a nanoparticle based modulator layer, according to one embodiment of principles described herein.

FIG. 6 is a cross-sectional diagram of the illustrative waveguide (500) of FIG. 5 with an integral nanoparticle-based modulator layer (604). According to one exemplary embodiment, the nanoparticle modulation layer (604) extends down the center of the waveguide (500) in a vertical rather than a horizontal configuration. A substrate (610) coated with a passivation layer (608) forms the base for the layers deposited above. A silicon structure (602) is formed on the passivation layer (608) with right and left electrodes (612, 614) abutting the silicon structure (602). The modulator layer (604) is surrounded and supported by a silicon structure (602). The electrode configuration in this illustrative embodiment allows for a voltage to be placed across the left electrode (612) and the right electrode (614), thereby creating an electrical field through the modulation layer (604).

The geometric configuration of the waveguide is presented only to illustrate one possible design. A variety of orientation and configurations could be selected to best fit the desired application, economics, and manufacturing constraints. By way of example and not limitation, the modulation layer (604) could be in a different orientation and/or the electrodes (612, 614) could be in a different configuration. A variety of design parameters such as the gap between the modulation layer (604) and the silicon dioxide layer (608) could be adjusted to maximize the modulation efficiency and minimize the undesirable losses/in a given application.

The modulation layer (604) need not extend down the entire length of the waveguide (500). The length of the modulation layer (604) can depend on a variety of factors including the desired level of modulation, the allowable level of loss through the waveguide, the wavelength of light to be modulated, the absorptivity of the modulation layer, the available voltage source, the electrode configuration and other factors.

Figure 7:
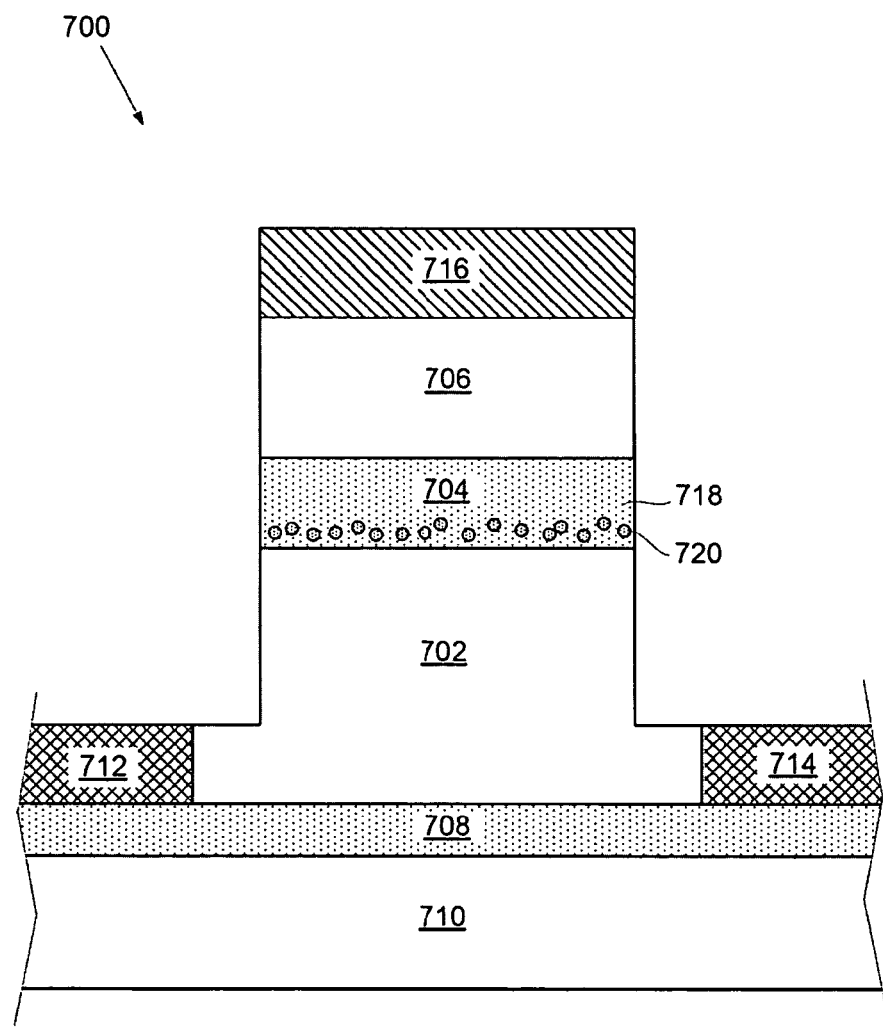
FIG. 7 is a cross-sectional diagram of an illustrative waveguide with a nanoparticle based modulator layer, according to one embodiment of principles described herein.

FIG. 7 is a cross-sectional diagram of an illustrative waveguide (700) with a nanoparticle modulator layer (704). Similar to previous embodiments, a passivation layer (708) is deposited on the substrate (710). Above the passivation layer (708), left and right electrodes (712, 714) are deposited. A lower transparent layer (702) is formed between the left and right electrodes (712, 714). A nanoparticle modulation layer (704) is formed on top of the lower transparent layer (702) with an additional upper transparent layer (706) being deposited above the modulation layer (704). An upper electrode (716) is deposited above the upper transparent layer (716).

The nanoparticle modulation layer (704) can be formed by obtaining nanoparticles (720) from an outside source and depositing the nanoparticles (720) in the desired location using a mechanical process. According to one embodiment, spin coating of a solution containing nanoparticles (720) is used to appropriately deposit the nanoparticles (720). Spin coating is a procedure used to apply a uniform thin film onto a substrate. The solution is placed on the substrate which is then rotated at a high speed to spread the fluid by centrifugal force. The rotation can be continued until the desired coverage and thickness of the film is obtained.

In this embodiment, the nanoparticles are suspended in a solvent solution which is deposited onto the optical substrate. The entire optical substrate is then rotated until the desired concentration and positioning of the nanoparticles is achieved. The solvent is then evaporated, leaving the nanoparticles in place.

According to one exemplary embodiment, a silicon nitride film ($SiN_x$) is then deposited over the nanoparticles (720). The silicon nitride film (718) forms a matrix which covers the nanoparticles (720). By way of example and not limitation, the silicon nitride film may be deposited using plasma enhanced chemical vapor deposition (PECVD). The epitaxial growth of the silicon nitride file (718) over the nanoparticles (720) can create a compressive or tensile force within the nanoparticles (720). A compressive force increases the bandgap of the nanoparticles (720) and lowers the wavelength of light to which the nanoparticles (720) are most sensitive. Conversely, the creation of a tensile force within the nanoparticles (720) lowers the bandgap and increases the wavelength of light to which the nanoparticles are most sensitive. Thus, by controlling the deposition of the matrix (718), the nanoparticles (720) could be tuned to increase the efficiency of the modulation layer (704). By way of example and not limitation, if Ge nanoparticles are used, the matrix layer could be deposited to impart tension into the Ge nanoparticles to decrease the bandgap and increase the wavelengths absorbed into the telecom wavelength of 1.55 microns.

Figure 8:
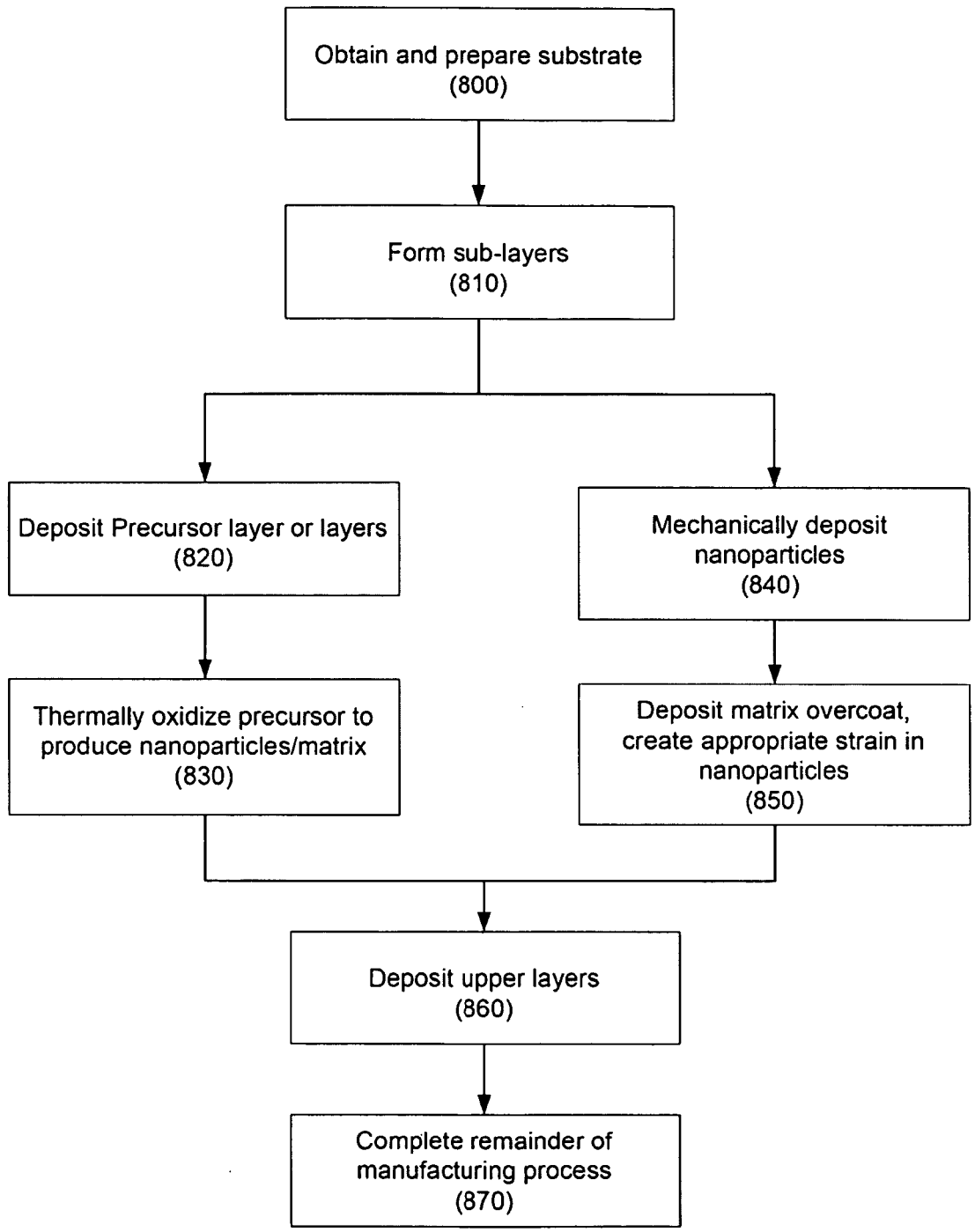
FIG. 8 is a flow chart of one illustrative method for forming a nanoparticle Quantum Confined Stark Effect modulator, according to one embodiment of the principles described herein.

FIG. 8 is a flow chart of one illustrative method for forming a nanoparticle Quantum Confined Stark Effect (QCSE) modulator. In a first step, a substrate is obtained and prepared (step 800). The various sub-layers, such as a passivation layer, one or more electrodes, and a first transparent layer, are then deposited or formed on the substrate (step 810). Alternatively, a silicon-on-silicon dioxide wafer can be obtained with the appropriate layers already formed. According to one exemplary embodiment, the nanoparticle QCSE modulator is formed by depositing a precursor layer or layers (step 810). The precursor layers are then manipulated to produce nanoparticles within a matrix (step 830). In one embodiment, a thermal oxidization process is used to create the nanoparticles and matrix.

In an alternative embodiment, the nanoparticle QCSE modulator layer is formed by mechanically depositing nanoparticles onto the desired surface (step 840). The matrix overcoat is then deposited over the nanoparticles (step 850). In some embodiments, the deposition of the matrix overcoat can produce strain within the nanoparticles such that optical absorption of the nanoparticles can be tuned to a desired range of wavelengths.

The upper layers, such as an additional transparent layer, one or more electrodes, coatings or passivation layers, can then be deposited over the nanoparticle QCSE modulator layer (step 860). The remainder of the manufacturing process can then be completed to form the finished product or component (step 870).

In sum, the methods described above for creating a nanoparticle modulation layers simplify the fabrication of modulation layers that utilize quantum dots or nanoparticles to create a QCSE modulator. The introduction of compressive or tensile strain into the nanoparticles allows for fine tuning of the nanoparticle bandgap.

In embodiments where the matrix which surrounds the particles is an insulator, the power loss due to leakage between the electrodes is reduced or eliminated. This allows for lower power consumption and less heating of the components during operation.

Where the modulation layer has a lower index of refraction than the surrounding materials and has an appropriate geometry, the modulation layer can form a slot waveguide which greatly confines the optical mode to the active region of the device. This decreases undesirable losses and increase the modulation efficiency of the optical device.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical modulator comprising:
    a first layer, said first layer being transparent or semitransparent over a range of optical wavelengths;
    a modulation layer comprising nanoparticles embedded in a matrix, said modulation layer being contiguous to said first layer;
    first and second electrodes, said first and said second electrodes being configured such that a voltage potential across said first and said second electrodes creates an electrical field through said modulation layer.
    wherein said nanoparticles in said matrix are under a compressive or tensile strain such that a band gap of said nanoparticles is shifted in response to said compressive or tensile strain.

2. The optical modulator of claim 1, wherein said modulation layer is sandwiched between said first layer and a second layer, said second layer being transparent or semitransparent over a range of optical wavelengths.

3. The optical modulator of claim 2, wherein said modulation layer has an index of refraction substantially lower than said first layer and said second layer; said modulation layer having a thickness substantially less than a wavelength of light passing through said optical modulator.

4. The optical modulator of claim 3, wherein said modulation layer acts as a slot waveguide.

5. The optical modulator of claim 1, wherein said nanoparticles are mechanically deposited onto a surface of said first layer and said matrix is deposited over said nanoparticles.

6. The optical modulator of claim 1, wherein said nanoparticles are germanium nanoparticles and said matrix is a silicon nitride compound.

7. The optical modulator of claim 1, wherein said modulator layer is formed by depositing a precursor layer, then thermally oxidizing said precursor layer to form said nanoparticles and said matrix.

8. The optical modulator of claim 7, wherein said precursor layer is a silicon germanium compound.

9. The optical modulator of claim 1, wherein said optical modulator is a ring resonator, said ring resonator being optically coupled to a tangential waveguide.

10. The optical modulator of claim 1, wherein said optical modulator is formed as an integral portion of a waveguide connected at a first end to an optical source and connected at a second end to an optical detector.

11. The optical modulator of claim 1, wherein said modulation layer is an electrical insulator.

12. A nanoparticle Quantum Confined Stark Effect (QCSE) modulator comprising:
a first layer, said first layer being transparent or semitransparent over a range of optical wavelengths;
a second layer, said second layer being transparent or semitransparent over a range of optical wavelengths;
a modulation layer comprising nanoparticles embedded in a matrix, said modulation layer being sandwiched between said first layer and said second layer; said modulation layer being an electrical insulator; said modulation layer being further configured to act as a slot waveguide;
a first electrode;
a second electrode, said first and said second electrodes being configured such that a voltage potential across said first and said second electrodes creates an electrical field that passes through said modulation layer;
wherein said matrix applies a compressive or tensile strain to said nanoparticles such that a band gap of said nanoparticles is shifted in response to said compressive or tensile strain.

13. The modulator of claim 12, wherein said nanoparticles are germanium nanoparticles.

14. A method for forming a nanoparticle Quantum Confined Stark Effect (QCSE) modulator comprising:
obtaining and preparing a substrate;
forming sub-layers on said substrate;
determining a wavelength of light that said modulator is to modulate;
forming a nanoparticle modulator layer, said nanoparticle modulator layer being an electrical insulator and having a thickness of less than said wavelength of light said nanoparticle QCSE modulator is designed to modulate; and
depositing upper layers over said nanoparticle modulator layer.

15. The method of claim 14, wherein said nanoparticle modulator layer is formed by depositing a precursor layer or layers, then altering said precursor layers to produce nanoparticles embedded within a matrix.

16. The method of claim 15, wherein said nanoparticle modulator layer is formed from said precursor layer or layers by thermal oxidization.

17. The method of claim 14, wherein said nanoparticle modulator layer is formed by mechanically depositing nanoparticles onto a desired surface, then overcoating said nanoparticles with a matrix.

18. The method of claim 17, wherein said overcoating said nanoparticles with said matrix creates strain within said nanoparticles such that optical absorption characteristics of said nanoparticles are altered.

19. The method of claim 14, further comprising tuning a bandgap of said nanoparticles by introducing a corresponding amount of compressive or tensile strain on said nanoparticles.

* * * * *

UNITED STATES PATENT AND TRADEMARK OFFICE
CERTIFICATE OF CORRECTION

PATENT NO. : 9,008,467 B2
APPLICATION NO. : 12/262312
DATED : April 14, 2015
INVENTOR(S) : Nathaniel Quitoriano et al.

Page 1 of 1

It is certified that error appears in the above-identified patent and that said Letters Patent is hereby corrected as shown below:

Claims

In column 10, line 59, in Claim 1, delete "layer." and insert -- layer; --, therefor.

Signed and Sealed this
Third Day of November, 2015

Michelle K. Lee
*Director of the United States Patent and Trademark Office*